May 24, 1932.   G. E. ATKINSON   1,860,006
COOKING RANGE
Filed April 20, 1929   2 Sheets-Sheet 1
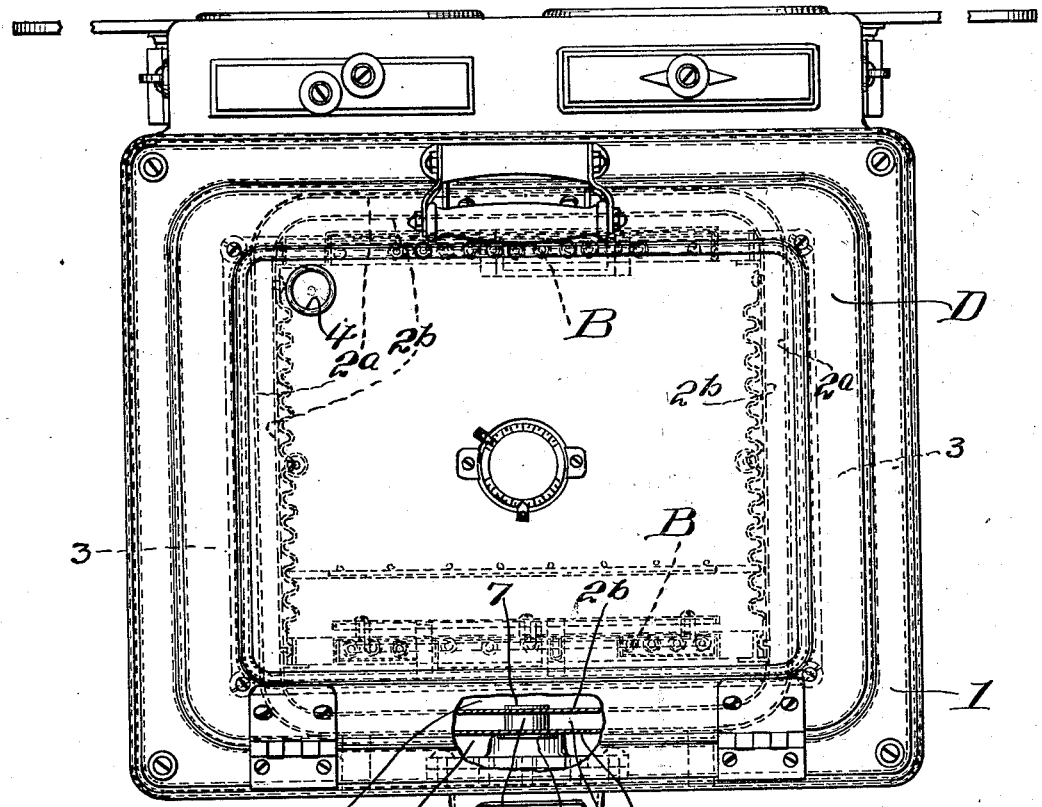
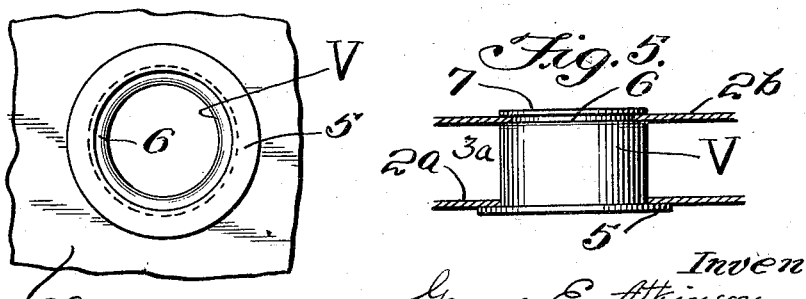
Inventor
George E. Atkinson
BY
ATTORNEYS

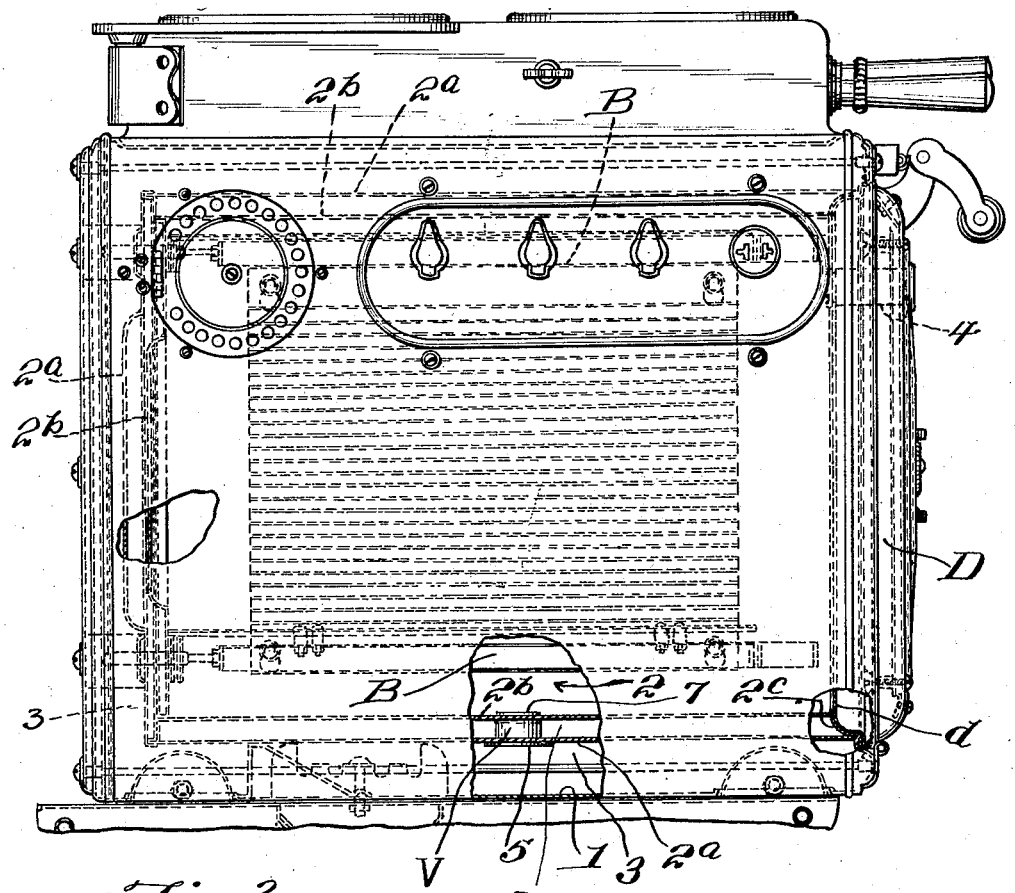
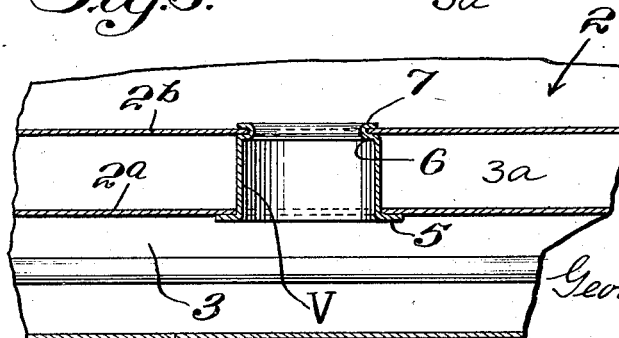

Patented May 24, 1932

1,860,006

UNITED STATES PATENT OFFICE

GEORGE EDWIN ATKINSON, OF PROCTORVILLE, OHIO, ASSIGNOR, BY MESNE ASSIGNMENTS, TO ARMSTRONG APPLIANCE CORPORATION, A CORPORATION OF DELAWARE

COOKING RANGE

Application filed April 20, 1929. Serial No. 356,757.

The invention is an improvement upon cooking ranges of the type having an oven with heating means therein, such as an example as that disclosed in Letters Patent of the United States granted to C. C. Armstrong, No. 1,669,803, dated May 15, 1928.

The invention is to prevent the precipitation of moisture within the oven with consequent dripping of water through the joint or seat about the door and the accumulation of water within the outer casing of the range.

The invention is shown in the accompanying drawings in which

Figure 1 is a front view and

Fig. 2 is a side view of a range embodying the invention.

Figs. 3, 4, and 5, are detail views showing the lower vent structure in vertical section, top plan, and elevation respectively.

In these drawings 1 indicates the outer casing of the range. The numeral 2 designates the oven, which is spaced apart from the wall of the outer casing, the intervening space being indicated at 3. The oven wall is formed double, the outer wall section or shell being designated 2a, and the inner wall section or shell being indicated at 2b. These wall layers or shells are spaced apart for heat insulating purposes and the space 3 between the oven body and the wall of the outer casing also contributes to heat insulation. The door shown generally at D is hinged at its lower end to the outer casing or frame 1. It has a protuberant portion d which is adapted to fit a seat 2c at the open front of the oven so as to seal the oven space and retain the heat therein which is produced by any suitable form of burner indicated generally at B within the oven, such as the electric heater ordinarily used in the Armstrong range.

It is customary to have a vent in the door communicating the interior oven space with the atmosphere. This in the present form of range is indicated at 4. It consists of a tubular member extending through the door and open at all times to the outside as well as to the oven space. This vent at times is not sufficient to prevent condensation of moisture within the oven and the objection has been experienced that, at times, dripping water around the door will occur and there will take place an accumulation of water within the outer casing of the range.

I have found that by providing a vent between the air space surrounding the oven body and the interior oven space, the objections just mentioned are avoided. This vent is indicated at V. It consists of a tubular member having a flange 5 to fit against the outer side of the outer wall 2a of the oven, said tubular member extending across the space 3a between the outer and inner wall sections 2a, 2b, and through the latter so that air space 3 is placed in communication with the interior of the oven. For securing this vent tube in place it is shouldered at 6 to fit against the inner wall or shell 2b and its end is crimped at 7 to embrace the edge of the said inner oven wall.

In the operation of the range it will be understood that when the oven is heated, say by an electric heating element or elements located therein, there will be no material degree of condensation of vapor upon the interior of the oven wall.

The vent in the door allows the pressure within the oven to become equalized substantially with the atmospheric pressure of the room, and prevents steam from being forced out around edges of door or out into space around body of oven.

When the electric heaters are turned off and the oven cools down, condensation of the moisture will take place under ordinary practice and in sufficient degree to cause dripping of water around the door and into the outer casing of the range. With my improvement this will be prevented within the range of temperature of ordinary cooking operations because the vent V in the bottom of the oven will allow the previously warmed air in the space 3, between the outer oven wall and the casing of the range to enter the oven and maintain the temperature of the air within the oven at a point relative to its humidity, as will prevent the precipitation of moisture upon the oven's inner wall, and therefore the objectionable dripping of water through the joint between the door and the oven will be obviated.

The heat insulating space between the layers 2a and 2b forming the double oven wall, is closed as shown by the drawings. The space 3 between the oven and the outer casing which contributes to heat insulation is also an air space completely closed except for the vent V as shown by the drawings.

I claim:

1. A range having an oven with an air space between said oven and the casing of the range, means for heating the oven, located wholly within the same a door closing the open front end of the oven, an air vent in the door communicating the interior of the oven with the room atmosphere, and an air vent communicating the air space between the oven and the said casing with the interior of the oven, substantially as described.

2. A range according to claim 1 in which the last mentioned air vent consists of a tubular member flanged on one end to fit against one wall of the double wall of the oven, said tube extending between the walls forming the double wall, having a shoulder fitting against the other wall of the double wall and having a flange crimped upon the opposite side of said other wall to embrace said wall between itself and the shoulder, substantially as described.

3. A range according to claim 1 in which the oven is double walled forming a closed air space therebetween and the last mentioned air vent comprises a tube extending between the walls of said double wall and across the dead air space between them, substantially as described.

4. A range according to claim 1 in which the oven is double walled forming an air space therebetween and the last mentioned air vent consists of a tube extending between the walls of said double wall and across the air space between them, substantially as described.

In testimony whereof, I affix my signature.

GEORGE EDWIN ATKINSON.